United States Patent [19]

Heath

[11] Patent Number: 5,542,249

[45] Date of Patent: Aug. 6, 1996

[54] EXHAUST APPARATUS

[75] Inventor: Edward H. Heath, Madison, Conn.

[73] Assignee: Madison Combustion Associates, Madison, Conn.

[21] Appl. No.: 141,408

[22] Filed: Oct. 22, 1993

[51] Int. Cl.[6] .................................................. F02B 37/00
[52] U.S. Cl. ............................ 60/293; 60/307; 60/324; 60/315
[58] Field of Search ........................... 60/315, 293, 307, 60/324

[56] References Cited

U.S. PATENT DOCUMENTS

| | | | |
|---|---|---|---|
| 1,286,365 | 12/1918 | Loomis | 60/902 |
| 2,606,573 | 8/1952 | Brobeck et al. | 73/861.63 |
| 2,649,685 | 8/1953 | Cohen | 60/293 |
| 2,806,347 | 9/1957 | Pertile | 60/315 |
| 3,017,948 | 1/1962 | Shepherd et al. | 60/902 |
| 3,314,230 | 4/1967 | Vanderpoel | 60/293 |
| 3,390,520 | 7/1968 | Mattson | 60/293 |
| 3,538,685 | 11/1970 | Breman | 55/230 |
| 3,593,499 | 7/1971 | Kile | 60/315 |
| 3,666,422 | 5/1972 | Rossel | 60/315 |
| 3,683,625 | 8/1972 | McCrink | 60/276 |
| 3,768,259 | 10/1973 | Carnahan et al. | 60/276 |
| 3,805,523 | 4/1974 | Tanasawa | 60/306 |
| 3,939,654 | 2/1976 | Creps | 60/276 |
| 4,012,907 | 3/1977 | Crayton | 60/315 |
| 4,475,512 | 10/1984 | Suzuki et al. | 60/276 |
| 4,707,987 | 11/1987 | Atkin | 60/324 |
| 5,012,641 | 5/1991 | Travalee | 60/315 |

FOREIGN PATENT DOCUMENTS

| | | | |
|---|---|---|---|
| 019780 | 6/1978 | Germany | 60/315 |
| 1402684 | 6/1988 | U.S.S.R. | |
| 0699923 | 11/1953 | United Kingdom | 60/315 |
| 0737128 | 9/1955 | United Kingdom | 60/315 |
| 0507710 | 6/1959 | United Kingdom | 60/315 |
| 9110817 | 7/1991 | WIPO | 60/315 |

*Primary Examiner*—Leonard E. Heyman
*Attorney, Agent, or Firm*—Bachman & LaPointe P.C.

[57] ABSTRACT

An exhaust apparatus for a combustion engine having a combustion chamber and an exhaust pipe for conveying exhaust gas in an exhaust stream from the combustion chamber wherein the exhaust apparatus includes a fan member disposed within the exhaust pipe and driven by the exhaust stream so as to create an area of low pressure between the fan member and the combustion chamber whereby extraction of exhaust gas from the combustion chamber is facilitated.

18 Claims, 2 Drawing Sheets

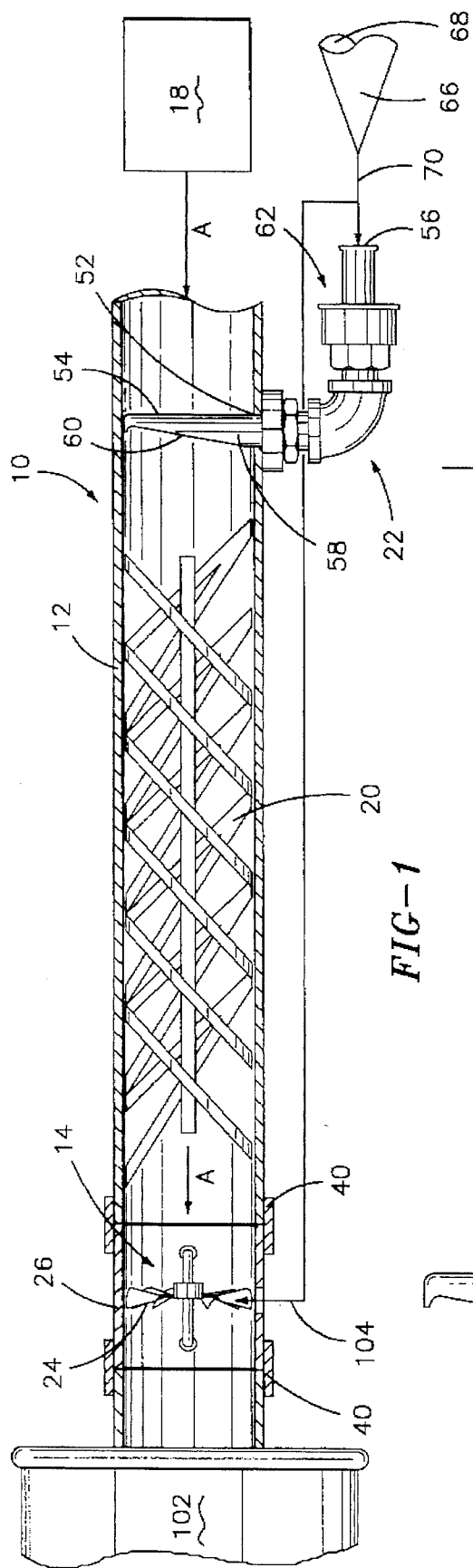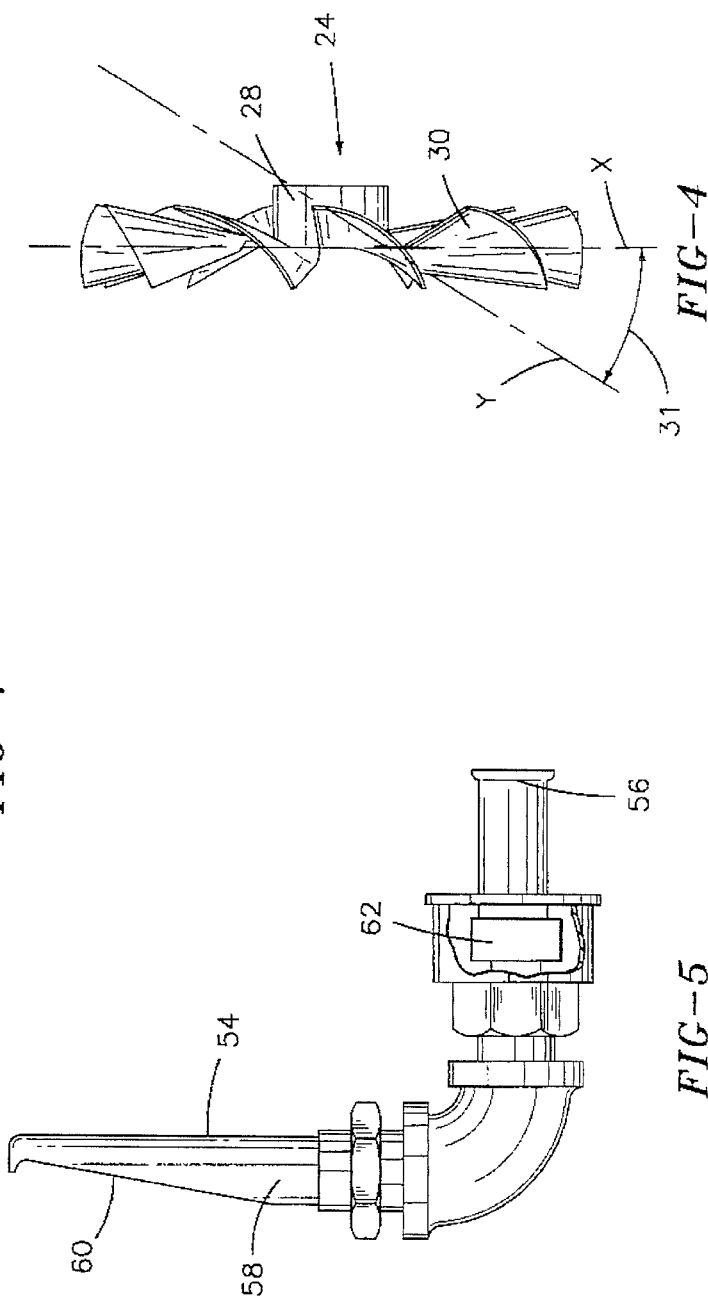

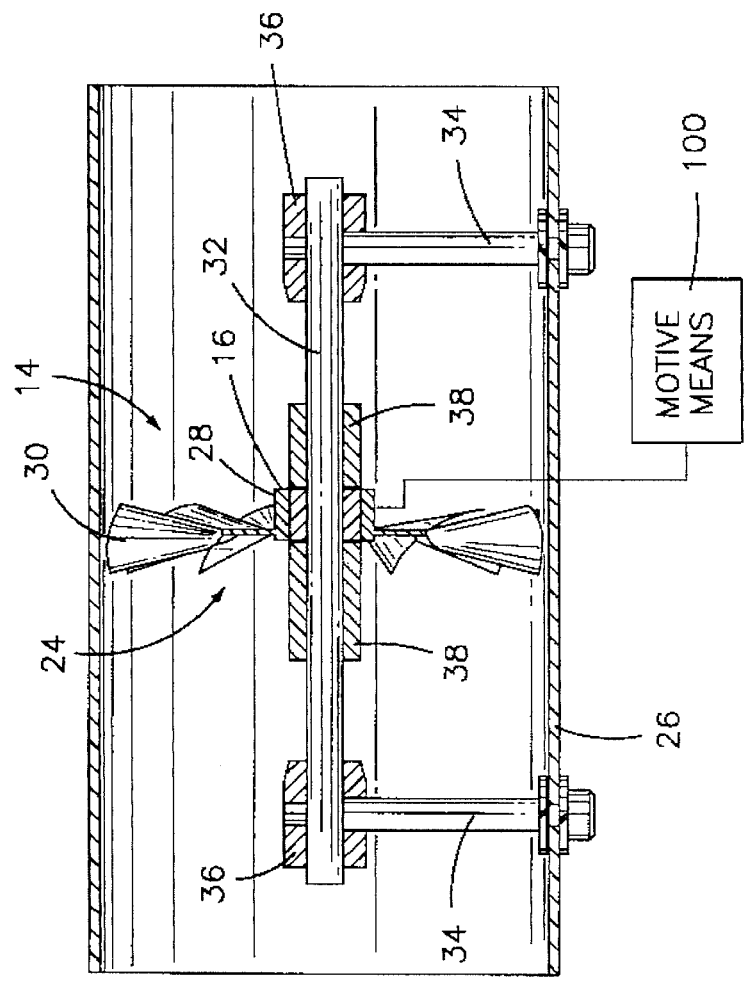
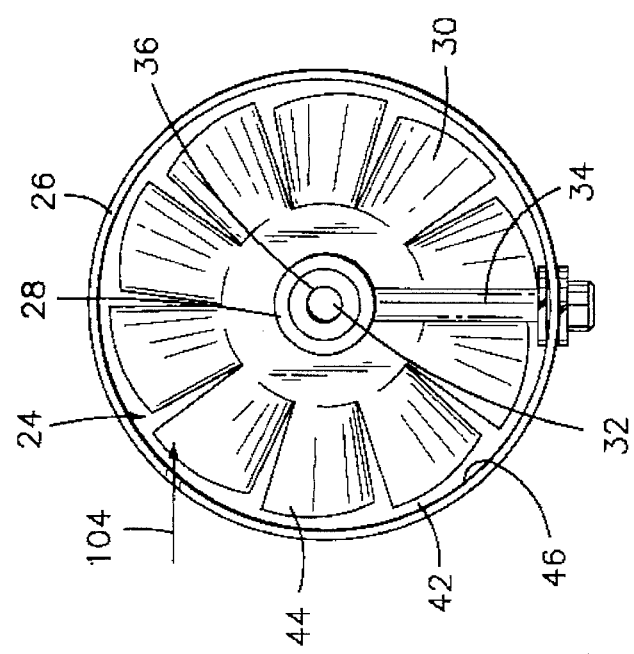
FIG-2
FIG-3

5,542,249

EXHAUST APPARATUS

BACKGROUND OF THE INVENTION

The invention relates to the field of combustion engines and, particularly, to an exhaust apparatus for placement in the exhaust stream of a combustion engine for improving the efficiency of the engine and for reducing pollutants in the exhaust stream.

Several devices have been disclosed with the purpose of improving operating efficiency and/or reducing pollutants in the exhaust gas issuing from a combustion engine, particularly the engine of an automobile or other vehicle.

U.S. Pat. No. 4,012,907 to Crayton discloses an example of such apparatus for attachment to an exhaust pipe. The device comprises a generally tubular housing open at both ends and containing two blades rotatably mounted on an axle within the housing. The housing is larger than the exhaust pipe to which it is to be attached so that external air can enter the leading open end and contact the blades so as to drive the blades and operate the mechanism. Obviously, the drive of this device does not operate when the vehicle is not moving. Further, the device must apparently be positioned at the end of the exhaust pipe. Finally, Crayton is silent regarding reduction in pollutants contained in the exhaust gas stream.

It is desirable to provide an apparatus which does not rely on some external drive mechanism for proper operation, and which also serves to reduce pollutants in the exhaust gas stream.

It is therefore the primary object of the present invention to provide an apparatus for improving the efficiency of a combustion engine.

It is another object of the invention to provide such an apparatus which is driven continuously by the exhaust gas stream of the engine.

It is a further object of the invention to provide such an apparatus which reduces the pollutants present in the exhaust stream.

It is a still further object of the invention to provide an apparatus as above which can readily be installed at a desired location of the exhaust system of a combustion engine.

Other objects and advantages will appear hereinbelow.

SUMMARY OF THE INVENTION

According to the invention, an exhaust apparatus is provided for positioning in the exhaust stream of a combustion engine. The apparatus is driven by the exhaust stream.

Particularly, the exhaust apparatus is provided for use with a combustion engine having a combustion chamber and an exhaust pipe for conveying exhaust gas in an exhaust stream from the combustion chamber. According to the invention, the exhaust apparatus comprises fan means disposed within the exhaust pipe and driven by the exhaust stream.

Air inlet means may be provided so as to mix air with the exhaust gas and thereby reduce pollution.

A static mixer may also be provided for imparting a swirling flow to the exhaust gas stream as it flows to the fan means. The swirling flow helps to drive the fan means and also helps to better mix the incoming air with the exhaust gas so as to improve the reduction in pollutants provided according to the invention.

BRIEF DESCRIPTION OF THE DRAWINGS

A detailed description of the preferred embodiments of the invention follows, with reference to the attached drawings, wherein:

FIG. 1 is a side schematic view of an apparatus according to the invention;

FIG. 2 is an enlarged side view of the fan assembly portion of an apparatus according to the invention;

FIG. 3 is an end view of the apparatus of FIG. 2;

FIG. 4 is a top view of a fan member according to the invention; and

FIG. 5 is an enlarged partially broken away side view illustrating an air inlet assembly according to the invention.

DETAILED DESCRIPTION

The invention relates to an exhaust apparatus for improving the operation of a combustion engine and also for reducing pollutants in the exhaust gas stream issuing from the combustion engine. The apparatus is intended for use in the exhaust pipe of a combustion engine wherein the exhaust pipe conveys or carries exhaust gas from the combustion chamber of the engine.

Typically, a combustion engine has an overlap period wherein the intake valve for injecting fuel into the combustion chamber and the exhaust valve for removing exhaust gasses from the combustion chamber are both open. This overlap is provided so that the injection of the fuel assists in forcing exhaust out of the combustion chamber. However, with this configuration, the intake charge of injected fuel can be diluted with exhaust which may result in a situation of less potential power and greater potential pollution. With the apparatus of the present invention, extraction of exhaust gas from the combustion chamber is improved by reducing the pressure into which the gasses flow, thereby avoiding the need to overlap the opening of both intake and exhaust valves as set forth above.

Referring now to FIG. 1, the apparatus is generally referred to in the drawings with reference numeral 10.

According to another aspect of the invention, an air inlet is provided for introducing air into the exhaust system and mixing the air with the typically very hot exhaust gas of the exhaust stream to allow further combustion or reduction of fuels and/or pollutants in the exhaust stream, thereby reducing pollution caused by the engine.

Referring now to the drawings, preferred embodiments of the invention and their operation as above will be described.

FIG. 1 illustrates various elements of apparatus 10 disposed for use in an exhaust pipe 12 of a combustion engine (not shown). Exhaust pipe 12 is typically connected to a manifold which is connected, through individual conduits, to the various combustion chambers of the combustion engine. A fan assembly 14 is positioned in exhaust pipe 12 so that the exhaust stream carried by exhaust pipe 12 drives the fan of fan assembly 14 as will be more fully described below. A static mixer 20 may be positioned within exhaust pipe 12 and upstream of fan assembly 14. An air inlet assembly 22 may also preferably be positioned upstream of fan assembly 14 and static mixer 20.

Referring now to FIG. 2, various elements of fan assembly 14 will be described. A fan member 24 is rotatably positioned within a tubular housing 26. Fan 24 preferably includes a hub 28 and a plurality of blades 30 extending from hub 28. Hub 28 may be rotatably positioned on an axle member 32 which is positioned substantially coaxially with tubular housing 26. Axle 32 may be supported on at least one, preferably two or more support members or shafts 34 as shown, with collar members 36 providing connection between shafts 34 and axle 32, and locating collars 38 fixed to axle 32 on either side of hub 28 to maintain axial position of fan 24. Hub 28 may preferably have a bushing 16 disposed therein. Bushing 16 provides a surface for interacting with axle 32. In this regard, axle 32 and bushing 16 are preferably made of materials which allow free rotation of bushing 16 and hub 28 relative to axle 32, preferably with a minimal amount of friction and wear. Carbide bushings and axle materials, for example, are particularly suitable for this purpose, and some or all of the elements may be further coated with one or more conventional friction reducing materials as desired so as to further reduce the friction and wear. Shafts 34 may be fixed to tubular housing 26 through any conventional means so as to provide rigid and secure positioning of fan 24. For example, shafts 34 may be connected to the wall of housing 26 and held in position in the wall by washers and locking nuts or any other means including but not limited to numerous mechanical fasteners, welding and the like. Preferably, the various connections between housing 26, shafts 34 and axle 32 are threaded or otherwise easily releasable so that apparatus 10 may be serviced if required.

Tubular housing 26 is preferably a separate section of tube or pipe which can be installed at any desired point along exhaust pipe 12, for example with adaptor collars 40 (See FIG. 1). In this manner, tubular housing 26 can be readily removed for servicing.

In accordance with the foregoing, apparatus 10 may be provided as a unitary add on device for connection, as is, to an existing exhaust pipe 12. Of course, fan 24 could alternatively be mounted within exhaust pipe 12 itself either during or after manufacture of the vehicle, engine, etc. Fan 24 is mounted in a freely rotating fashion and is positioned in exhaust pipe 12 so that the exhaust stream FIG. 3 shows an end view of fan 24 disposed within housing 26 in accordance with the invention. Fan 24 has a plurality of preferably equally spaced blades 30. Blades 30 are positioned so as to be driven by the exhaust stream from the combustion chamber 18. At least three blades 30 are suitable in accordance with the present invention. Ten blades as shown are preferable and have been found to provided an excellent drive of fan 24 by the exhaust stream while imposing a minimal obstruction to the flow of the exhaust stream. Blades 30 have a length selected so as to provide a small clearance 42 between blade tips 44 and the inside surface 46 of tubular housing 26 so as to maximize the driving force of the exhaust stream on fan 24. In this regard, tubular housing 26 is also preferably provided having a diameter which is similar to that of exhaust pipe 12.

FIG. 4 shows a top view of fan 24 so as to illustrate the preferred shape and orientation of blades 30 on hub 28. As shown, fan 24 has a general overall plane X which is substantially perpendicular to axle 32. Blades 30 are oriented at an angle to plane X, and are also preferably curved in cross section so as to provide a concave surface 48 on one side of blade 30 and a convex surface 50 on the other side of blade 30. Blades 30 are oriented so that a general plane Y of each blade 30 is disposed at an angle 31 to plane X of between about 30 to about 60 degrees. Further, for application in an exhaust pipe for a typical automobile, blades 30 preferably have a radius of curvature Z of between about 0.25 to about 2.5 inches. Of course, for use with exhaust pipes of drastically larger or smaller diameter, different radii of curvature for blades 30 may be appropriate. Fan 24 is preferably positioned within housing 26 so that convex surfaces 50 of blades 30 face upstream and concave surfaces 48 face downstream. This orientation of concave and convex surfaces helps to maximize the drive of the exhaust stream imparted to fan 24. Blade tips 44 are also preferably arcuate in shape so as to substantially conform to the inside surface 46 of housing 26.

It should also be noted that blades 30 may be oriented at angles to either side of plane X so as to provide for rotation in either a clockwise or counter clockwise manner as desired, and that either orientation is certainly within the scope of the present invention.

According to the invention, static mixer 20 (FIG. 1) may preferably be provided so as to impart a swirling flow to the gasses of the exhaust stream and also to improve the mixture of air from air inlet assembly 22 with the exhaust gas. Static mixer 20 preferably comprises a baffle or coil or other flow directing structure which is disposed in exhaust pipe 12 upstream of fan member 24. The baffle structure may suitably be a series of angled plates positioned so as to impart a swirling motion to the stream of exhaust gasses as the stream flows by mixer 20. The plates are preferably angled so as to present a minimal obstacle to flow of the exhaust gas stream. The swirling motion serves to improve the drive of fan 24 by the exhaust stream. Of course, any conventional and/or known structure could similarly be used for providing the desired swirling flow and mixing. Static mixer 20 may preferably be between about 2 to about 30 inches in length, more preferably about 3 to about 9 inches depending upon the engine and exhaust system in question. It is also noted that static mixer 20 may serve to provide an additional reduction in sound or engine noise issuing from the exhaust system.

FIG. 5 illustrates air inlet assembly 22 in accordance with the invention. As shown, an inlet 52 for air is provided which passes through the wall of exhaust pipe 12. An injector 54 is preferably positioned in inlet 52. Injector 54 is preferably a substantially tubular structure communicating at one end 56 with a source of air. The other end is preferably a tube member 58 which extends into exhaust pipe 12. A downstream portion of tube member 58 is cut away or removed so that air can flow from the air source into exhaust pipe 12. Positioning of the opening 60 or cut away portion of tube member 58 facing open downstream in exhaust pipe 12 serves to draw air into exhaust pipe 12 with a venturi type flow and also minimizes the interference in flow of the exhaust stream which might be caused for example by an opening facing upstream into the exhaust gas stream. It has been found that, when the combustion engine is operating at slower or idling speeds, air inlet 52 may allow exhaust gas to exit or escape through inlet 52. Since this is undesirable, air inlet assembly 22 also preferably includes a check valve 62 (shown schematically in FIG. 5) positioned so as to block all flow out of inlet 52, and to open for flow into inlet 52. Check valve 62 may be any structure suitable to provide proper check valve operation. Of course, the actual structure of the check valve forms no part of this invention, and numerous conventional check valves are available which are suitable for use with the invention.

In order to improve air flow to air inlet assembly 22, an air collector 66 may be provided having an open end 68 and being connected to injector 54 through check valve 62 via hose 70 or any other desired conduit. Collector 66 may typically be a funnel, scoop or other structure which serves to collect and channel air into hose 70. Collector 66 is preferably oriented so as to face into a flow of air. For example, collector 66 may be positioned facing forward on a vehicle so that forward motion of the vehicle serves to force air into collector 66. In this regard, check valve 62 is preferably opened by a pressure difference between the air source or upstream side of check valve 62 and the inside area of exhaust pipe 12. Collector 66 serves to drive air toward the upstream side of check valve 62 and thereby to increase the pressure difference so as to provide proper opening of the valve when desired.

Referring now back to FIG. 1, the operation of apparatus 10 according to the invention will be further discussed. Operation of apparatus 10 begins when the engine is started. As the engine idles at a relatively slow speed, a correspondingly small amount of exhaust gas is generated. The exhaust gas flows from combustion chamber 18 in the direction of arrow A past closed air inlet assembly 22 and into static mixer 20. Mixer 20 imparts a swirling flow to the gas. The swirling gas flows to fan 24, where the force of the gas impacting upon blades 30 of fan 24 causes rotation of fan 24. Further, forward motion of the vehicle drives air into collector 66 and against the upstream side of check valve 62. When the upstream/downstream pressure difference relative to check valve 62 surpasses a desired level, check valve 62 opens and air is drawn and/or forced into exhaust pipe 12 through injector 54. The resistance of check valve 62 is preferably set so that the valve will open when the pressure difference is large enough to ensure that back flow of exhaust gas out of inlet 52 is prevented. Incoming air mixes with the exhaust gas, especially while passing through static mixer 20. Thorough mixing of this additional air with the exhaust gas at the elevated temperatures of the gas stream serves to further combust or reduce pollutant materials carried by the exhaust gas. Thus, a combustion engine equipped with an apparatus according to the invention exhibits increased fuel efficiency and provides an exhaust gas stream having reduced pollutants.

With engines having a small displacement and/or with engines which spend a relatively large amount of time at idle speeds, it may be desirable to supplement the exhaust drive of fan 24 with additional motive means. FIG. 2 also illustrates an alternate embodiment of the invention wherein additional motive means 100 are provided. The additional motive means may of course be any conventional motive means such as an electric motor, a belt drive to a moving part of the engine, or any other conventional means which may be desired. The additional motive means 100 does not replace the exhaust drive, but rather is a supplement to it. Further, additional motive means 100 may be positioned at any desired location inside or outside, preferably outside, of tubular housing 26 as desired. Additional motive means 100 may include belt connections to fan 24 or some other drive mechanism which must pass through exhaust pipe 12 or tubular housing 26. If this is the case, apparatus 10 is preferably positioned downstream of the muffler and other operative elements of the exhaust system so as not to interfere with proper operation of the exhaust system. It is desirable that such a supplemental drive be operable to accelerate when the combustion engine accelerates so that the full efficiency and pollutant benefits of the invention can be realized. Drives associated by belts with moving parts of the engine will, of course, accelerate with the engine. Electric motors, especially brushless motors, may advantageously be tied in to the throttle switch of a typical vehicle having a combustion engine so as to provide acceleration of the electric motor with the combustion engine as desired.

The apparatus 10 according to the invention may be positioned at any desired location along the exhaust system of the engine. FIG. 1 shows apparatus 10 positioned upstream of the muffler 102. Apparatus 10 may also preferably be positioned downstream of the catalytic converter 101 (see FIG. 2). This positioning is advantageous because apparatus 10 in such a position also improves operation of the catalytic converter by improving the flow of exhaust gas therethrough. Furthermore, various elements of apparatus 10 may be positioned at different locations along exhaust pipe 12 as desired. For example, air inlet assembly 22 may be positioned at any convenient location in the exhaust system, preferably at or upstream of fan 24.

It should be noted that a plurality of fan assemblies 14, mixers 20 and/or air inlet assemblies 22 could be utilized in series in the exhaust system in accordance with the present invention.

Also as shown in FIG. 1, an air inlet 104 (shown schematically) may be positioned so as to introduce a stream of air into exhaust pipe 12 in a direction or plane substantially normal to a longitudinal axis of exhaust pipe 12 in the general vicinity of fan 24 and offset from the central axis (see FIG. 3), so as to impart a swirling flow to the stream which helps to drive fan 24.

Air may be fed to air inlet 104 via collector 66 or any other means as desired such as, for example, an additional collector. It should also be noted that air inlet 104 may be included either in addition to or in place of air inlet assembly 22. In this regard, air introduced at fan 24 would of course also serve to further combust and/or reduce potential pollutants in the exhaust gas stream as thoroughly described above with reference to air inlet assembly 22.

Thus disclosed is an apparatus for the exhaust system of a combustion engine which improves the efficiency of the engine and also reduces the pollutants contained in the exhaust gas stream.

EXAMPLES

A 1979 Pontiac Catalina having a 301 CID engine was tested to determine the pollution levels in a base test (Run #1) and then after installation of an exhaust apparatus according to the invention (Run #2). At an air temperature of 74° F., a relative humidity of 42% and a barometric pressure of 30.03 inches Hg, the exhaust was tested for hydrocarbon (HC) and carbon monoxide (CO) emissions. The results are set forth below in Table 1.

TABLE 1

|  | HC (ppm) | CO (%) |
| --- | --- | --- |
| Run #1 | 91 | 4.65 |
| Run #2 | 71 | 2.03 |
| Improvement | 22% | 55% |

As shown, the apparatus of the present invention provides significant reductions in HC and CO levels in the exhaust.

The apparatus according to the invention was also tested on a 1981 Buick Regal having a V-6 231 CID engine. Pollutant levels were reduced by an average of 47% while fuel economy was improved by 12.7%. The reduction in pollutant levels was found to be dependent upon the amount of air introduced and mixed with the exhaust gas. With no air inlet, a reduction in pollutant levels of 32% was observed. With a simple vent to allow in flow of air, the average reduction increased to 42%. When the apparatus was equipped with a collector and mounted on a moving vehicle so as to apply a pressure to the in flowing air, 15 lb of air pressure provided an average reduction in pollutant levels of 47–49% while at 30 lb of air, 58–60% reduction was achieved.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. An exhaust apparatus for a combustion engine having a combustion chamber and an exhaust pipe for conveying exhaust gas in an exhaust stream from the combustion chamber, the exhaust apparatus comprising: fan means disposed downstream of the combustion chamber within the exhaust pipe and driven by the exhaust stream; and static mixing means for imparting a swirling flow to the exhaust stream, the static mixing means being positioned upstream of the fan means, whereby swirling flow of the exhaust stream facilitates drive of the fan means.

2. An exhaust apparatus for a combustion engine having a combustion chamber and an exhaust pipe for conveying exhaust gas in an exhaust stream from the combustion chamber, the exhaust apparatus comprising: fan means disposed downstream of the combustion chamber within the exhaust pipe and driven by the exhaust stream; air inlet means for communicating an inner space of the exhaust pipe with a source of air; and static mixing means for imparting a swirling flow to the exhaust stream, the static mixing means being positioned in the exhaust pipe upstream of the fan means whereby swirling flow of the exhaust stream facilitates drive of the fan means.

3. An apparatus according to claim 2, wherein the static mixing means further serves to mix the exhaust stream with the air so as to facilitate reaction with pollutants in the exhaust stream.

4. An apparatus according to claim 3, wherein the static mixing means comprises a plurality of baffles disposed in the exhaust pipe upstream of the fan means and arranged so as to impart the desired swirling flow.

5. An exhaust apparatus, comprising:
a substantially tubular housing adapted for substantially sealing connection to an exhaust pipe of a combustion engine, the tubular housing having substantially the same diameter as the exhaust pipe; and
fan means disposed within the housing so that when the housing is connected to the exhaust pipe, an exhaust stream from the combustion engine drives the fan means; air inlet means for communicating an inner space of the exhaust pipe with a source of air; wherein said air inlet means is positioned so as to introduce a stream of air into the housing into a plane of rotation of the fan means in a plane substantially normal to a longitudinal axis of the housing and offset from the axis so as to impart a swirling flow to the stream of air whereby rotation of the fan means is facilitated.

6. An exhaust apparatus for a combustion engine having a combustion chamber and an exhaust pipe for conveying exhaust gas in an exhaust stream from the combustion chamber, the exhaust apparatus comprising: fan means disposed downstream of the combustion chamber within the exhaust pipe and driven by the exhaust stream; air inlet means for communicating an inner space of the exhaust pipe with a source of air; wherein said air inlet means is positioned so as to introduce a stream of air into the exhaust pipe into a plane of rotation of the fan means in a plane substantially normal to a longitudinal axis of the exhaust pipe and offset from the axis so as to impart a swirling flow to the stream of air whereby rotation of the fan means is facilitated.

7. An apparatus according to claim 6, wherein the fan means comprises an axle means disposed within the exhaust pipe and a fan member comprising a hub rotatably mounted to the axle and a plurality of fan blades extending radially from the hub.

8. An apparatus according to claim 7, wherein each fan blade has a concave surface and a convex surface, and wherein the convex surface of each blade faces into the exhaust stream.

9. An apparatus according to claim 8, wherein each fan blade has a radius of curvature of between about 0.25 to about 2.5 inches.

10. An apparatus according to claim 7, wherein the fan blades are turned at an angle to a general plane of the fan member, wherein the angle is between about 30 to about 60 degrees.

11. An apparatus according to claim 7, wherein the fan member has at least three blades.

12. An apparatus according to claim 11, wherein the fan blades are spaced substantially equally around the hub.

13. An apparatus according to claim 7, wherein the fan member has ten blades.

14. An apparatus according to claim 13, wherein the fan blades are spaced substantially equally around the hub.

15. An apparatus according to claim 6, wherein the air inlet means comprises a normally closed check valve which is opened by an increase in a pressure differential between the source of air and the inner space.

16. An apparatus according to claim 6, wherein the apparatus is positioned on a vehicle, the apparatus further comprising a collector having an open end facing forward on the vehicle for collecting air and conduit means for conveying air from the collector to the air inlet means whereby, when the vehicle is in motion, air is collected by the collector and fed through the conduit means to the air inlet means.

17. An apparatus according to claim 6, wherein the exhaust pipe includes a catalytic converter, and wherein the fan means is positioned downstream of the catalytic converter.

18. An apparatus according to claim 6, further including supplemental drive means for driving the fan means, whereby drive of the fan means by the exhaust stream is facilitated.

* * * * *